Jan. 7, 1964    M. E. SIEGERT    3,116,951
WINDOW LATCH MECHANISM
Filed April 18, 1962    2 Sheets-Sheet 1
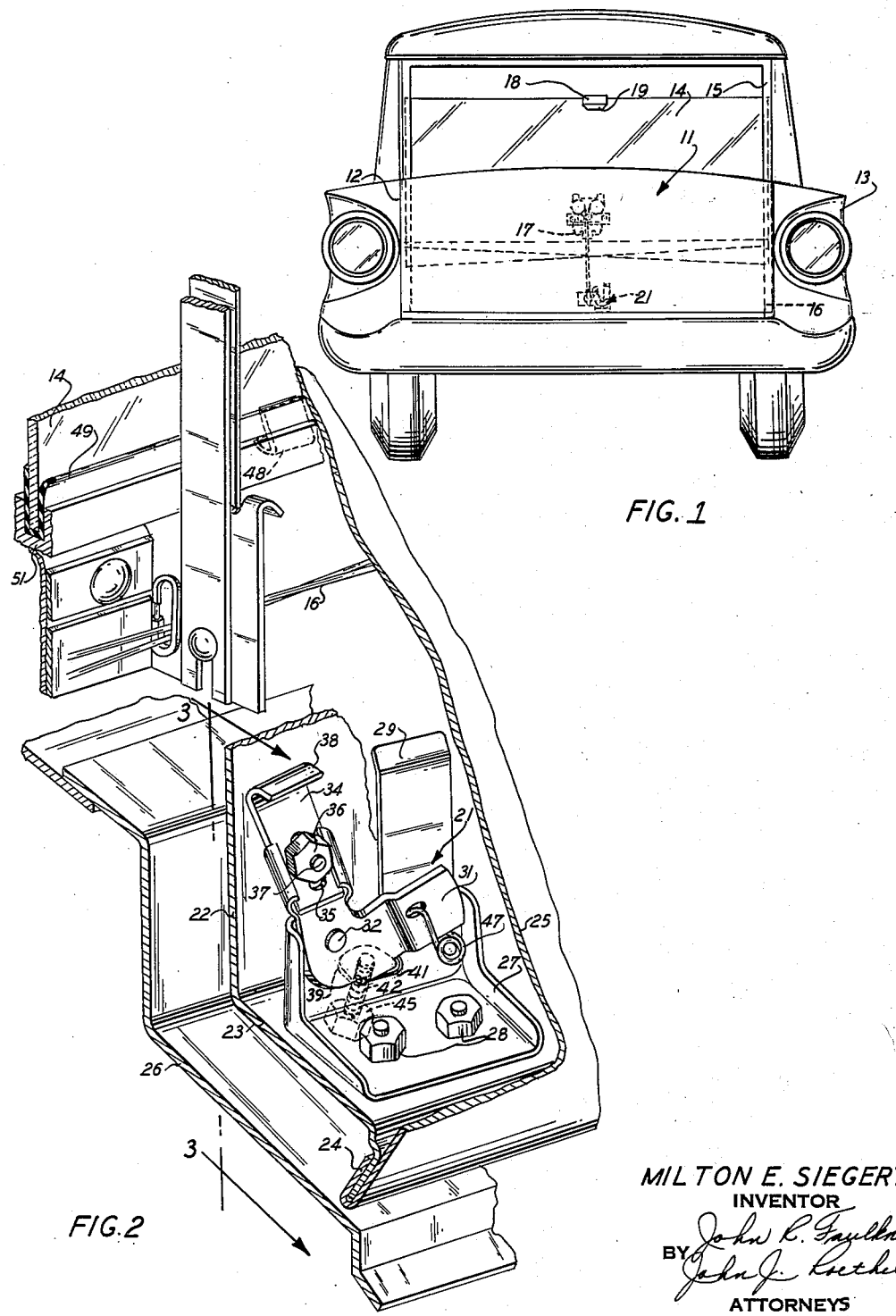
MILTON E. SIEGERT
INVENTOR
BY
ATTORNEYS Jan. 7, 1964    M. E. SIEGERT    3,116,951
WINDOW LATCH MECHANISM
Filed April 18, 1962    2 Sheets-Sheet 2

MILTON E. SIEGERT
INVENTOR

BY
ATTORNEYS

United States Patent Office 3,116,951
Patented Jan. 7, 1964

3,116,951
WINDOW LATCH MECHANISM
Milton E. Siegert, Livonia, Mich., assignor to Ford Motor Company, Dearborn, Mich., a corporation of Delaware
Filed Apr. 18, 1962, Ser. No. 188,382
6 Claims. (Cl. 296—106)

This invention relates to a latch mechanism for holding a retractable window in a retracted position within a swingable closure structure of a motor vehicle.

Currently, most windows in motor vehicles are adapted to be moved to an opened or to a closed position by a hand cranked or power operated mechanism. Hand cranked mechanisms require considerable manual effort to operate and power operated mechanisms are relatively expensive to install. The simplest, fastest, and least expensive construction and arrangement is one in which the window is manually grasped and pushed to an opened or closed position as desired. This, however, requires the window to be counterbalanced for ease of operation.

The utilization of counterbalanced windows in closure structures creates the problem of maintaining the window in a retracted position when the closure structure is being swung to an opened position since no holding means, such as is inherent in a power or manually operated crank mechanism, is operative to effectively retain the slidable window within the closure structure during the various positions the swingable closure structure may assume.

Accordingly, it is an object of the present invention to provide a holding device in the form of a latch mechanism for a manually operable counterbalanced window which effectively retains the window in its fully opened or retracted position within the closure structure when the latter is swung to an opened position.

The latch mechanism embodying the present invention is constructed and arranged to be in an unlatched position when the closure structure is in a closed position to permit the manual movement of the retracted window to a fully opened position or any intermediate position between a fully closed and a fully opened position.

The latch mechanism embodying the present invention is particularly suited to a station wagon tailgate which is pivotally mounted for swinging movement from a vertical or closed position to a horizontal or opened position at the rear of a station wagon body. When the window is in its retracted position and the tailgate member is swung open to a horizontal position to load or unload the station wagon body, the weight of the window is ineffective to prevent its outward movement from its retracted position. This may result in the breaking of the exposed window or cause serious injury to the person opening the tailgate.

Other objects and advantages of the present invention will become more apparent from the following description when considered in connection with the accompanying drawings in which:

FIGURE 1 is a rear elevational view of a vehicle body showing a station wagon tailgate and window arrangement embodying the latch mechanism of this invention;

FIGURE 2 is an enlarged perspective view of the latch mechanism of this invention with the tailgate structure partially cut away to provide a clear view of the latch mechanism and a portion of the counterbalanced window; and, FIGURE 3 is an enlarged sectional view taken along line 3—3 of FIGURE 2.

Figure 3:
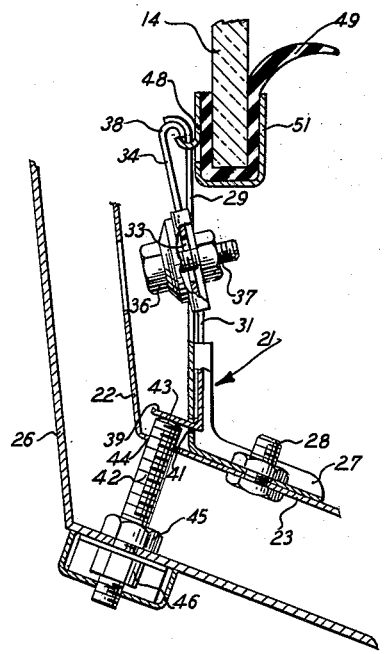

Referring now particularly to FIGURE 1 of the drawings there can be seen a tailgate structure, generally designated as 11, mounted in a rear exit opening 12 of a station wagon vehicle body 13. The tailgate structure 11 is swingably mounted at the lower edge of the vehicle body 13 for movement to a vertical or closed position as shown or to an opened position in which case the tailgate structure 11 is disposed in a generally horizontal position with respect to the vehicle body 13.

The tailgate structure 11 has a counterbalanced window 14 which is movable between a closed position at which time it completely seals the rear exit opening 12 when the tailgate structure 11 is in a vertical position or to a fully opened position wherein the window 14 is retracted within the tailgate structure 11.

When the window 14 is in the closed position, its opposite side edges are received within guide channels 15 which are affixed to the vehicle body 13 at the upper side portions of the exit opening 12. Since the window 14 is received within the fixed guide channels 15 when in a closed position, the window 14 must be in an opened or fully retracted position within the tailgate member 11 before the tailgate member 11 can be swung to an opened position. Guide means 16 are provided to retain the counterbalanced window 14 within the tailgate structure 11. Further, the guide means 16 keeps the window aligned with the guide channels 15 attached to the vehicle body 13 to permit the movement of the window 14 to a closed position.

A control and counterbalance mechanism 17 is provided for holding the movable window 14 in the tailgate structure 11 in any intermediate vertical position between a fully closed and a fully opened position. One type of such control and counterbalance mechanism is disclosed in my copending application Serial No. 163,564, filed January 2, 1962.

An upper window bracket 18 is attached to the upper portion of the window 14. This bracket 18 is trough shaped with a flange 19 projecting outwardly to permit the easy grip on the window 14 for raising or lowering the window manually from the outside of the vehicle body 13.

Referring now to FIGURES 2 and 3, the latch mechanism, generally designated 21, embodying the present invention is illustrated in detail as installed in the tailgate structure 11 of the vehicle body 13.

In FIGURE 2 is seen the lower portion of the tailgate member 11 which comprises an inner sheet metal member 22 having an outwardly extending flange 23 at its bottom edge. This flange 23 is interlocked at seam 24 with the lower edge of an upwardly extending outer sheet metal member 25. As can be seen in FIGURES 2 and 3, the lower portion of the tailgate structure 11 in its closed or vertical position is received within an L-shaped door jamb member 26 which forms a part of the vehicle body 13.

An angular-shaped bracket 27 of the latch mechanism 21 is attached by a fastening means 28, such as a screw and nut, to the bottom flange 23 of the inner sheet metal member 22 between the upwardly extending portion of the inner and outer sheet metal members 22 and 25 so that the bracket 27 is completely contained within the tailgate structure 11. A guide member 29 is affixed to one end of the upwardly extending portion of the bracket 27 while an L-shaped lever 31 is pivotally connected to the other end of the upwardly extending portion of the bracket 27 by a dowel pin 32. The upwardly extending leg of the L-shaped lever 31, which is provided with an aperture 33, is bent inwardly to make an acute angle with the vertical plane as seen in FIGURE 3.

An extension lever arm 34, which is provided with a slot 35, is fastened to the upwardly extending leg of the L-shaped lever 31 by means of nuts 36 threaded on a bolt 37 which extends through the aperture 33 and slot 35. The extension lever arm 34 is provided with an inwardly projecting hook portion 38 at its terminal end.

At the bottom edge of the lever 31 is a horizontally projecting flange 39 which extends through an opening 41 in the upwardly extending portion of the bracket 27.

An abutment member such as a striker bolt 42, which extends generally vertically, is fastened to the door jamb member 26 of the vehicle body 13. The tip 43 of the striker bolt 42 extends through an opening 44 in the bottom flange 23 to engage the bottom surface of the flange 39 projecting from the lever 31 when the tailgate structure 11 is in a vertical position as best seen in FIGURE 3. The striker bolt 42 is mounted to the vehicle body by an adjusting nut 45 and a lock nut 46 on each side of the door jamb member 26.

An overcenter spring 47 is provided which has one end attached to the bracket 27 while the other end is fastened to the horizontally extending leg of the L-shaped lever 31. The spring 47 maintains the upwardly extending leg of the L-shaped lever 31 along a substantially vertical axis when in its normally biased position to assure that the hook portion is engaged with a hook receiving means 48 on the window 14 as hereinafter described upon the disengagement of the flange 39 from the tip 43 of the striker bolt 42.

The slideable counterbalanced window 14, upon being retracted, is received within the tailgate structure 11 between the inner and outer sheet metal members 22 and 25. A weatherstrip 49 covered by a metal moulding 51 is attached to the lower portion of the window 14. The hook receiving means 48 is affixed to the inwardly facing surface of the metal moulding 51. When the window is in its fully opened or retracted position and the tailgate member 11 is in a vertical or closed position, the hook portion 38 is in approximate radial alignment with the hook receiving means 48 affixed to the window 14.

In the operation of the latch mechanism 21 of this invention, the window 14 is moved downwardly to an opened or fully retracted position by exerting a downward pressure on the flange 19 of the bracket 18. When the tailgate structure 11 is in the vertical or closed position, the lever 31 and the extension lever arm 34 with its associated hook portion 38 are in an off-center position due to the engagement of the flange 39 with the tip 43 of the striker bolt 42. This prevents the engagement of the hook portion 38 with the hook receiving means 48 to permit the manual movement of the retracted window 14 in an upward direction.

When the tailgate structure 11 is swung to a horizontal or opened position, the flange 39 of the latch mechanism 21, which is contained within the tailgate member 11, will move up and away from the tip 43 of the stationary vertically extending striker bolt 42. The off-center spring 47 will rotate the lever 31 to its normally biased position about the dowel pin 32 to cause the engagement of the hook portion 38 with the hook receiving means 48 attached to the lower part of the retracted window 14. Since the window 14 has to be in its fully retracted position in order for the tailgate structure 11 to be swung to an opened or horizontal position, the radial alignment of the hook portion 38 on the lever 31 with the hook receiving means 48 on the window 14 is maintained.

When the tailgate structure 11 is swung from a horizontal position to a closed or vertical position, the flange 39 on the lever 31 abuts the tip 43 of the striker bolt 42 extending through the opening 44 to cause the lever 31 and its associated hook portion 38 to pivot to an off-center position to disengage the hook portion 38 from the hook receiving means 48 affixed to the window 14. This will permit the movement of the window 14 from its retracted position to any intermediate position between its fully opened and fully closed positions when the tailgate structure 11 is in a closed position.

The slot 35 provided in the extension lever arm 34 permits the adjustment of the hook portion 38 to assure proper radial alignment of the latter with the hook receiving means 48 to assure their firm engagement when the tailgate structure 11 is swung to an opened position. The guide member 29 extending vertically from the bracket 27 makes contact with the lower portion of the window 14 in its retracted position to maintain the retracted window in substantially vertical alignment.

Nuts 45 and 46 permit the adjustment of the tip 43 of the striker bolt 42 with respect to the vehicle body 13 to compensate for misalignment and wear.

It will be understood that the invention is not to be limited to the exact construction shown and described but that various changes and modifications may be made without departing from the spirit and scope of the invention as defined in the appended claims.

I claim:

1. In a vehicle body including an exit opening defined at the bottom by a door jamb member, a tailgate pivotally mounted at the bottom of said exit opening for movement between a vertical and a horizontal position, a window slidably mounted within said tailgate for movement between a retracted and a closed position, detent receiving means on the lower part of said window, abutment means on said door jamb member, a latch mechanism in said tailgate having detent means pivotally movable into engagement with said detent receiving means on said window when said window is in a retracted position and said tailgate is swung to the horizontal position, said abutment means abutting said detent means to pivotally disengage the latter from said detent receiving means on said window to permit sliding movement of said window to a closed position when said tailgate member is in a vertical position.

2. In a vehicle body including an exit opening defined at the bottom by a door jamb member, a tailgate pivotally mounted at the bottom in said exit opening for movement between a vertical and a horizontal position, a window slidably mounted within said tailgate for movement between a closed and a retracted position, detent receiving means mounted on the lower portion of said window, a striker bolt mounted on said door jamb member, a latch mechanism pivotally attached to said tailgate and comprising a lever having a flange and a detent means, said detent means pivotally movable into engagement with said detent receiving means on said window when said window is in a retracted position and said tailgate is swung to a horizontal position, said striker bolt abutting said flange thereby causing the disengagement of said detent means from said detent receiving means on said window to permit sliding movement of said window to a closed position when said tailgate is in a vertical position.

3. In a vehicle body including an exit opening defined at the bottom by a door jamb member, a tailgate pivotally mounted at the bottom in said exit opening for movement between a vertical and a horizontal position, a window slidably mounted within said tailgate and adapted to be moved between a retracted position and a closed position, hook receiving means on the lower portion of said window, a striker bolt extending substantially vertically from said door jamb member, a latch mechanism in said tailgate comprising a bracket, a lever having a flange and a hook portion, said hook portion pivotally movable into engagement with said hook receiving means on said window when said window is in a retracted position and said tailgate is swung to a horizontal position, said striker bolt abutting said flange to cause the pivotal disengagement of said hook portion from said hook receiving means on said window to permit sliding movement of said window to a closed position when said tailgate member is in a vertical position, and a resilient means normally biasing said hook portion into engagement with said hook receiving means on said window when the latter is in a retracted position and said tailgate member is swung to a horizontal position.

4. In a vehicle body including an exit opening defined at the bottom by a door jamb member, a tailgate having an inner and outer sheet metal member and a bottom flange, said tailgate pivotally mounted at the bottom in said exit opening for movement between a vertical and a horizontal position, a window slidably mounted within said tailgate member for movement between a closed position and a retracted position, hook receiving means on the lower portion of said window, a striker bolt extending generally upwardly from said door jamb member, a latch mechanism comprising a bracket mounted on the bottom flange and between said inner and outer sheet metal members of the tailgate, an L-shaped lever pivotally connected to said bracket, an extension lever with a hook portion affixed to the vertically extending leg of said L-shaped lever, resilient means connecting said lever with said bracket, said resilient means normally biasing said hook portion into engagement with said hook receiving means on said window when said window is in a retracted position and said tailgate is in a horizontal position, and a flange on said lever, said flange abutting said striker bolt when said tailgate is in a vertical position, thereby pivotally disengaging said hook portion from said hook receiving means on said window to permit sliding movement of said window to a closed position.

5. The latch mechanism as described in claim 4 and which is further characterized in that said extension lever is adjustable in a vertical direction.

6. The latch mechanism as described in claim 4 and which is further characterized in that said striker bolt is mounted on said door jamb by an adjustable fastening means, said fastening means being adapted to permit the vertical adjustment of the tip of said striker bolt with respect to said door jamb member.

References Cited in the file of this patent
UNITED STATES PATENTS

| | | |
|---|---|---|
| 2,793,907 | Hess et al. | May 28, 1957 |
| 2,970,006 | Velavicius | Jan. 31, 1961 |